United States Patent [19]

Sadanandan et al.

[11] 4,404,875
[45] Sep. 20, 1983

[54] INSTALLER DRIVE UNIT FOR CHEMICAL ANCHOR

[75] Inventors: Kunissey P. Sadanandan, Reading, Pa.; Raymond S. Guntulis, Manchester, Conn.

[73] Assignee: USM Corporation, Farmington, Conn.

[21] Appl. No.: 399,402

[22] Filed: Jul. 19, 1982

Related U.S. Application Data

[63] Continuation of Ser. No. 170,285, Jul. 18, 1980.

[51] Int. Cl.³ .............................................. B25B 13/50
[52] U.S. Cl. ..................................... 81/53.2; 405/261
[58] Field of Search .............................. 405/259–262; 81/53.2; 29/240

[56] References Cited

U.S. PATENT DOCUMENTS

| | | | |
|---|---|---|---|
| 958,980 | 5/1910 | Thomas | 81/53.2 X |
| 1,549,041 | 8/1925 | Berg | 81/53.2 |
| 1,566,691 | 12/1925 | Perry | 81/53.2 |
| 2,622,466 | 12/1952 | Vander Bos et al. | 81/53.2 |
| 2,800,820 | 7/1957 | Retterath | 81/53.2 |
| 3,244,055 | 4/1966 | Schuermann et al. | 405/259 X |

FOREIGN PATENT DOCUMENTS

| | | | |
|---|---|---|---|
| 346351 | 11/1904 | France | 81/53.2 |
| 2254715 | 7/1975 | France | 405/261 |
| 318830 | 12/1969 | Sweden | 405/260 |
| 2034850 | 6/1980 | United Kingdom | 405/261 |

*Primary Examiner*—Dennis L. Taylor
*Attorney, Agent, or Firm*—William F. White

[57] ABSTRACT

A drive unit for inserting threaded studs into drilled holes, the unit including a shank with an extension at one end adapted to be inserted into a drill chuck, a threaded extension at the other end and a polygonally shaped central portion.

3 Claims, 2 Drawing Figures

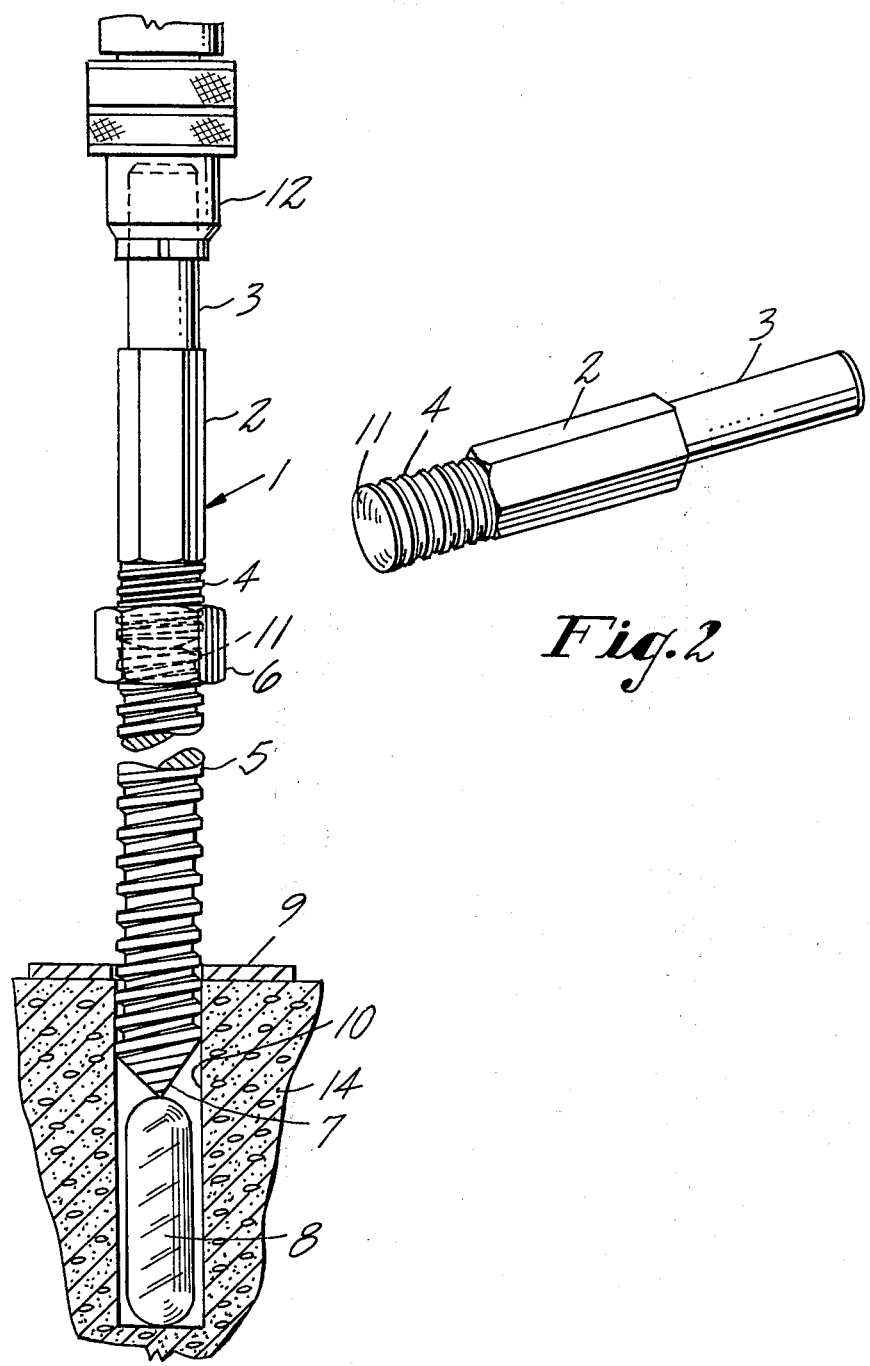

INSTALLER DRIVE UNIT FOR CHEMICAL ANCHOR

This application is a continuation, of application Ser. No. 170,285, filed July 18, 1980.

BACKGROUND OF THE INVENTION

The present invention relates to a convenient and efficient drive unit for the installation of threaded studs with resinous materials into holes formed in concrete, mansonry, rock or the like. A device for containing the resinous materials is disclosed in the U.S. Pat. No. Re. 25,869 to Schuermann et al. Threaded studs secured by resinous materials are frequently employed in lining mine openings and tunnels, making safe overhanging rock walls and for structural engineering purposes such as reinforcing foundations, securing machines on such foundations or to provide facilities for mounting or attaching other parts on or to their outer ends such as to form hooks. The resin employed has a small shrinkage upon hardening and is placed into the drill hole and will penetrate the surrounding crevaces, fissures or cracks in the rock or cementatious material surrounding the drill hole and fill it to secure the stud.

DESCRIPTION OF THE PRIOR ART

In the reissue patent mentioned above, the anchor is fixed into concrete, masonry, rock or the like by placing a frangible ampule of resinous material into a drilled hole and then twisting a threaded stud into the hole with a rotary drill. The threaded stud breaks the ampule and forces the resinous material to flow around the threads. A tool commonly used for inserting the stud includes three pieces of equipment. One is an elongated hex-nut which is threaded onto an end of the stud and the second is a slotted-head cap screw which is adapted to be threaded into the hex-nut and to receive a third piece which is a shank that can be connected to a drill chuck. Because such drive units are formed of several parts, they are expensive to manufacture and parts can become lost during operation. The shank wears out from time to time and falls from the cap screw fairly easily. Moreover the engagement of the stud and the hex-nut frequently becomes very tight so that after installation of the stud it is extremely difficult to separate the two.

SUMMARY OF THE INVENTION

According to the present invention we have developed a drive unit to insert a threaded stud having a predetermined diameter into concrete, masonry, rock or the like. The drive unit includes a shank having a central portion with a generally polygonal cross section and being adapted to receive a wrench. One end of the shank has a generally circular cross section which is adapted to be inserted into the chuck of a drill and the other end is threaded. The diameter of the threaded end is substantially the same as the diameter of the stud so that a conventional nut can be threaded onto both to lock the two together for insertion. In the preferred embodiment the thread of the threaded portion of the drive unit has an undercut on the abutment side, that is, some of the flank of the thread is removed to reduce friction and to enable the conventional nut to be easily removed after the stud has been inserted. In a further aspect of the invention, the distal end of the threaded portion of the drive unit is convexly shaped so as to reduce the amount of engagement between the drive unit and the threaded stud when the two are joined together and engage each other.

BRIEF DESCRIPTION OF THE DRAWINGS

FIG. 1 is an elevational view, partially in cross section, of the drive unit attached at one end to a threaded stud and at the other end to the chuck of a rotary drill. The threaded stud is shown partially inserted in a drilled hole with the end abutting against an ampule of resinous material.

FIG. 2 is a perspective view of the drive unit shown in FIG. 1.

DESCRIPTION OF THE PREFERRED EMBODIMENTS

Referring now to FIGS. 1 and 2, the drive unit 1 includes a generally cylindrical shank having a central portion 2 with a generally polygonal and preferably hexagonal cross section so as to receive a conventional wrench. The upper end 3 of the drive unit 1 is adapted to receive a conventional chuck 12 of a rotary drill (not shown). The lower end 4 of the drive unit 1 is threaded with threads of the same pitch as the stud 5 to be inserted into concrete, masonry, rock or the like 14. Preferably, the threads 4 are undercut, that is a portion of the flank is removed so that the contact between the threads of the nut 6 and the threads 4 of the drive unit 1 shifts from a surface engagement to more closely approximate a line engagement. In that way the drive unit can be loosely fit with a nut 6 that is used to attach it to the threaded stud 5 and reduce friction between threads to avoid disturbance of the anchor when the drive unit 1 is being removed after installation.

The nut 6 is of conventional shape and design and attaches the drive unit 1 to the threaded stud 5. As shown, the threaded stud 5 may have a chamfered end 7 to enable it to readily break ampule 8 with the resin. A washer 9 or other structural member may be disposed about the stud 5 during insertion if desired. As shown, the ampule 8 and the stud 5 are disposed in a hole 10 drilled in concrete, masonry, rock or the like 14. The hole 10 is carefully drilled so that it will have a diameter approximating the outside diameter of the stud 5 and also be of a predetermined depth.

As more clearly shown in FIG. 2, the distal end 11 of the threaded portion 4 is generally convex (relative to the axis of the drive unit) so as to reduce friction with the end of the stud 5 when the two are joined together. As seen in phantom lines in FIG. 1, the convex end 11 abuts the flat surface of the stud 5 when the two are joined together with nut 6.

To seat the threaded stud 5 into a drilled hole 10 with a resin, we drop the ampule 8 into the hole 10. The hole 10 has been drilled to appropriate depth and corresponds to the diameter of the stud 5. All dust is blown out. The threaded stud 5 has a predetermined thread pitch and is attached to the threaded portion 4 (having a similar predetermined thread pitch) of the drive unit 1 by nut 6. The nut 6 of course has the same predetermined thread pitch as the threaded stud 5 and the threaded portion 4. The shank 3 is inserted into the chuck 12 and the chuck is tightened. The nut 6 is threaded to half its thickness onto the threaded portion 4 of the drive unit 1 and the stud 5 is then threaded into nut 6. The chamfered end 7 of the stud 5 is forced against the ampule 8 to break it and the drill is switched on engaging the drive unit to transfer rotary and percussive action to the stud 5 which is driven down to the bottom of the hole resulting in a thorough mixing of the chemicals around the stud. When the stud reaches the bottom of the hole 10 the drill is switched off. Two wrenches are then used, one being placed around the nut 6 and the other being placed around the central portion 2 of the drive unit 1 and they are twisted in opposite directions. The twisting disconnects the nut 6 from the drive unit 1 without disturbing the positioning of the stud 5. The stud 5 is allowed to remain undisturbed for a specified curing time and devices to be attached are placed on the stud 5. The bolt is thus securely fixed in position in the bore 10 by chemical bond and the attachments can be securely fixed to the base 14.

It is to be pointed out that although the upper portion 3 is shown having a cylindrical cross section that can easily fit into a drill chuck, this portion can be made with an "A" taper to allow it to be inserted in a number of different size drills or it is possible to attach the chuck permanently to the shank 3.

It is apparent that modifications and changes can be made within the spirit and scope of the present invention but it is our intention, however, only to be limited by the appended claims.

Having thus described our invention, what we claim as new and desire to secure by Letters Patent of the United States is:

1. A drive unit for a threaded stud of predetermined diameter and thread pitch that is to be rotatably driven through the action of a rotary drill into a frangible ampule placed within masonry, concrete, rock or the like, said drive unit comprising:
    a nut having a uniform thread diameter and a uniform thread pitch for threadably engaging the threads of said stud, said nut adapted to receive a first wrench;
    a shank of unitary construction having a central portion with a generally polygonal cross-section and adapted to receive a second wrench;
    said shank further having a first unitary cylindrical extension, disposed at one end of said central portion, for insertion into the chuck of a rotary drill; and
    said shank still further having a second unitary extension with a threaded portion disposed at the other end of said central portion, the diameter and thread pitch of said threaded portion being substantially the same as said predetermined diameter and thread pitch of said stud whereby said nut having the same predetermined thread pitch and diameter is threaded onto both said stud and said threaded portion on the secondary extension of said shank so as to lock the two together prior to the stud being driven into a medium by rotation of the rotary drill and whereby said stud is ultimately detached from said shank by engaging the central portion with the second wrench and the nut with the first wrench and twisting the wrenches in opposite directions so as to disconnect the nut from the threaded portion of said second unitary extension without disturbing the inserted condition of said stud within the frangible ampule.

2. The unit according to claim 1, wherein the thread of said threaded portion is undercut so as to establish a loose and easily removable relationship between said nut and said threaded portion.

3. The unit according to claims 1 or 2, wherein the distal end of the threaded portion is convexly shaped so as to reduce the amount of engagement between the drive unit and the threaded stud when the two are joined together and engage each other.

* * * * *